US011347037B2

(12) United States Patent
Measel et al.

(10) Patent No.: US 11,347,037 B2
(45) Date of Patent: May 31, 2022

(54) LUMINOUS FLUX COLLECTOR FOR DIRECTING LIGHT INTO A LIGHT-DIFFUSING FIBER

(71) Applicant: Methode Electronics, Inc., Chicago, IL (US)

(72) Inventors: Erik Lee Measel, Oxford, MI (US); Hamed Karimi Sharif, North Vancouver (CA); Nicholas Stephen Downes, Langley (CA)

(73) Assignee: Methode Electronics, Inc., Chicago, IL (US)

( * ) Notice: Subject to any disclaimer, the term of this patent is extended or adjusted under 35 U.S.C. 154(b) by 443 days.

(21) Appl. No.: 16/149,874

(22) Filed: Oct. 2, 2018

(65) Prior Publication Data

US 2019/0101734 A1 Apr. 4, 2019

Related U.S. Application Data

(60) Provisional application No. 62/567,083, filed on Oct. 2, 2017.

(51) Int. Cl.
*G02B 19/00* (2006.01)
*G02B 27/30* (2006.01)
(Continued)

(52) U.S. Cl.
CPC ....... *G02B 19/0009* (2013.01); *G02B 6/0006* (2013.01); *G02B 6/262* (2013.01); *G02B 19/0028* (2013.01); *G02B 19/0061* (2013.01); *G02B 27/0916* (2013.01); *G02B 27/30* (2013.01)

(58) Field of Classification Search
CPC .. G02B 6/0006; G02B 6/262; G02B 19/0009; G02B 19/0028; G02B 19/0061; G02B 27/0916; G02B 27/30
See application file for complete search history.

(56) References Cited

U.S. PATENT DOCUMENTS

2005/0201100 A1 9/2005 Cassarly et al.
2011/0007320 A1 1/2011 Krauss et al.
(Continued)

FOREIGN PATENT DOCUMENTS

WO WO 2006/125028 A2 11/2006
WO WO-2015172794 A1 11/2015

OTHER PUBLICATIONS

Partial European Search Report dated May 31, 2021 from corresponding EP Patent Application No. 18864212.8.

*Primary Examiner* — Jack Dinh
(74) *Attorney, Agent, or Firm* — Blank Rome LLP

(57) ABSTRACT

A luminous flux collector comprises a housing, a wide-angle light capturing device and an optical collimating device, arranged around a longitudinal axis. The housing surrounds and protects the wide-angle light capturing device and the optical collimating device. The housing also provides structural support to hold the other elements in position. The wide-angle light capturing device can include a receptacle for receiving a light source, and the wide-angle light capturing device collects light with a spread angle of at least 120 degrees from the light source. The wide-angle light capturing device is disposed within a proximal end of the housing along the longitudinal axis. The optical collimating device extends from the wide-angle light capturing device to a distal end of the housing along the longitudinal axis.

17 Claims, 3 Drawing Sheets

(51) Int. Cl.
*G02B 6/26* (2006.01)
*F21V 8/00* (2006.01)
*G02B 27/09* (2006.01)

(56) References Cited

U.S. PATENT DOCUMENTS

2011/0149592 A1 6/2011 Artsyukhovich et al.
2014/0313766 A1 10/2014 Krupa et al.
2015/0369991 A1 12/2015 Bauco et al.
2017/0122525 A1 5/2017 Root et al.

LUMINOUS FLUX COLLECTOR FOR DIRECTING LIGHT INTO A LIGHT-DIFFUSING FIBER

CROSS-REFERENCE TO RELATED APPLICATIONS

This application claims priority to U.S. Provisional Patent Application No. 62/567,083 filed on Oct. 2, 2017 the content of which is herein incorporated by reference in its entirety.

BACKGROUND OF THE INVENTION

Field of the Invention

The present application relates to a luminous flux collector for directing visible light into a light-diffusing fiber. More particularly, the light-diffusing fiber has a diameter less than 200 microns and the light source can be an light emitting diode ("LED") that emits a light beam with a wide spread angle.

Description of Related Art

Optical fibers, which are thin, flexible fibers usually formed of glass or plastic, are well known for transmitting light with little loss and are well used for many applications including transmitting data, medical devices, telecommunications, and lighting. Typically, the light source that is directed into the optical fiber is a laser because lasers can be made to emit light in a focused beam, making it well suited for directing it into a small diameter optical fiber.

Corning Incorporated is a technology leader for technologies relating to optical fibers. The company has developed a number of optical fibers including light-diffusing fiber sold under the trademark Fibrance®, which has many applications for decorative lighting. Light diffusing fibers, unlike traditional optical fibers, allow for portions of light transmitted into the fiber to diffuse out of external curved surface of the fiber along its length. Many optical fibers have small core diameters, the portion of the optical fiber which receives and carries the light through the fiber. For example, the Fibrance® branded light-diffusing fiber has a core diameter of 170 microns. While it is theoretically possible to use any light source for illuminating optical fibers having a less than about 200 micron core, known practical light sources have been limited to lasers, since lasers can be made to emit a focused light beam that has properties favorable to this application, as compared to most other light sources. The focused light beam of lasers have made it easier to collect and direct luminous flux from a laser light source and to direct it into small diameter optical fibers such as light-diffusing fibers and, in particular, the Fibrance® branded light-diffusing fibers, which have a diameter that is less than 200 microns. In photometry, luminous flux, which is also sometimes called luminous power, is the measure of the perceived power of light.

Corning Incorporated has filed patent applications for solutions for collecting light from lasers and directing it into small diameter light-diffusing fibers. For example, US Patent Application Publication No. US 20150369991, entitled "Light Diffusing Fiber Lighting Device Having a Single Lens," discloses an arrangement that positions the lens so that it is optically aligned with the emission point and the terminal end of the optical fiber is optically aligned with the lens of the light source, with the terminal end being less than 2.5 millimeters from the emission point. US Patent Application Publication No. US 20150346411, entitled "Light Diffusing Fiber Lighting Device," discloses another approach that simply positions the terminal end so that it is optically aligned with the light source and within a distance of less than 1.0 millimeter from the emission point. International Patent Publication No. WO 2016/178962, entitled "Optical Fiber Lighting Device and Method," discloses a device for directing light generated from a plurality of laser diodes but this arrangement uses what is described as a plurality of collimating lenses, one associated with each laser diode, which does not capture light from a wide spread angle and a field lens is employed as the second optical element for focusing the captured light onto the terminal end of an light-diffusing optical fiber. As with the other approaches developed for laser light sources, this would also not work for an LED light source.

While these arrangements might work when lasers are used as the light source, they are not able to collect sufficient light from an LED light source to be effective for illuminating optical fibers in many scenarios, for example, illuminating a light-diffusing fiber when less expensive LEDs are substituted as the light source.

There are many differences in the properties of lasers compared to LEDs that contribute to requiring a different solution when LEDs are used as the light source instead of lasers. For example, lasers are monochromatic, collimated (non-divergent) and coherent, meaning that the wavelengths are in-phase. LEDs generate a broad range of wavelengths so they are not coherent. Also, the light from LEDs in not collimated. Furthermore, the power output from LEDs is orders of magnitude lower, with typical lasers having a power output that is measured in watts, while the power output of LEDs is typically measured in milliwatts.

For this application, two of the most important characteristics of a light source are source area and solid angle. Solid angle is the two-dimensional angle in a three-dimensional space that an object subtends at a point. A product of the source area and its solid angle of a beam of light as it passes through an optical system stays constant. For laser light sources, the source light can be collected and focused into a precise spot and the only limitation on the size of the spot is diffraction. This means that the diameter of an optical fiber is not an obstacle, even at less than 200 microns as long as the focusing lens is free of defects that might result in diffraction. However, when the same light focusing arrangements that are used for lasers were tested with LED light sources, less than 3% efficiency was achieved, meaning that with a 100-milliwatt LED output only 3 milliwatts was transmitted into a 170-micron diameter light-diffusing fiber. Furthermore, the luminous flux that did enter into the light-diffusing fiber was non-collimated and attenuated unevenly within the length of the light-diffusing fiber.

Accordingly, in order to use less expensive LEDs as the light source for small diameter light-diffusing fibers and other small diameter fibers, a new solution is needed for collecting light from a wide spread angle, and collimating the luminous flux before directing it into the terminal end of the fiber.

BRIEF SUMMARY OF THE INVENTION

Example luminous flux collectors for directing light into a light-diffusing fiber are provided that feature a housing, a wide-angle light capturing device and an optical collimating device, together arranged around a longitudinal axis that is shared by each of these elements. In example embodiments, the housing surrounds and protects the wide-angle light capturing device and the optical collimating device. The housing also provides structural support to hold the other elements in position.

The wide-angle light capturing device can include a receptacle for receiving a light source, and the wide-angle light capturing device collects luminous flux with a spread angle of at least 120 degrees from the light source. In certain aspects of the disclosure, the wide-angle light capturing device collects luminous flux with a spread angle of up to 180 degrees. In one aspect of the disclosure, the wide-angle light capturing device is disposed within a proximal end of the housing along the longitudinal axis.

In another aspect of the disclosure, the optical collimating device extends from the wide-angle light capturing device to a distal end of the housing along the longitudinal axis. In yet another aspect of the disclosure the, optical collimating device directs luminous flux from the light source to a focal point less than 200 microns in diameter at the distal end.

In one example aspect of the disclosure, the wide-angle light capturing device is adapted to capture luminous flux from a light source that has a wide spread angle such as a light source that uses LEDs to generate the luminous flux. The wide-angle light capturing device, in one aspect of the disclosure, is adapted to reflect luminous flux that it captures a plurality of times with each reflection of luminous flux bending the luminous flux closer towards the longitudinal axis.

In exemplary embodiments, the wide-angle light capturing device is a near field lens. For example, the near field lens can be a solid light transmitting lens with a concave surface facing the light source. In another example, the near field lens can comprise a hollow interior and be formed by a parabolically-shaped light-reflective interior surface with the diameter of the near field lens increasing further from the LED or other light source. The light-reflective interior surface can be shaped to utilize total internal reflection by capturing luminous flux striking the light-refractive interior surface at an angle greater than the critical angle. In other embodiments, the wide-angle light capturing device has a cylindrical shape with a light-reflective interior surface.

Generally, the wide-angle light capturing device takes luminous flux from a spread angle of at least 120 degrees and up to about 180 degrees and reflects or otherwise bends the path of the luminous flux closer to the longitudinal axis, and this luminous flux is then collected by the optical collimating device, which collimates and focuses it onto a focal point with a diameter less than about 200 microns. To achieve this result, the optical collimating device can take a variety of forms as described in the following non-limiting examples. It should be noted that the luminous flux may be reflected more than once and in multiple directions prior to ultimate focusing. It should also be noted that the exact size and dimensions of each of the light capturing device, optical collimating device, lenses and housing will depend on the respective sizes of the light source, the fiber optic core, the intensity of the luminous flux, as well as the wave length.

In certain aspect of the disclosure, the optical collimating device is a tapered optical pipe. For example, the tapered optical pipe can have a surface that is concave facing the light when it adjoins the wide-angle light capturing device, and that has a surface that changes its curvature to convex nearer to the distal end. In other embodiments, the optical collimating device can be a backward near field lens or a specular funnel. In yet other examples, the optical collimating device can comprise a plurality of focusing lenses, such as a series of biconvex lenses arranged with decreasing diameters as the luminous flux progresses further along the longitudinal axis in the direction of the focal point at the distal end. The housing surrounding the optical collimator can have an interior surface that is optically reflective. For example, the interior surface surrounding the housing can be shaped to utilize total internal reflection by capturing luminous flux striking the interior surface at an angle greater than the critical angle.

The wide-angle light capturing device and the optical collimating device can together form a teardrop shape, having an increasing and then decreasing diameter, with the wide-angle light capturing device being associated with a wide side of the teardrop shape and the optical collimating device spanning from the wide side of the teardrop shape to a point of the teardrop shape. In one example of a teardrop shape, the diameter increases from the light source towards the target in a concave form to a maximum diameter at which point the diameter decreases in a concave form until an inflection point at which point the diameter decreases in a convex form to towards the tip. In this and other embodiments, the wide-angle light capturing device and the optical collimating device can be formed as one unified piece.

A lighting device that comprises a luminous flux collector is disclosed. In addition to the luminous flux collector, this device includes an elongated housing having a longitudinal axis, a light source, and a coupling. The light source includes at least one light emitting diode and is capable of producing a beam of light centered on the longitudinal axis. The light source is associated with a proximal end of the housing along the longitudinal axis. The coupling is associated with a distal end of the housing opposite to the proximal end, and has a mechanism for holding a terminal end of an optical fiber in a fixed position within the coupling. The luminous flux collector can have the features and elements of the luminous flux collector as described above and as described in more detail below with reference to the drawings. When the luminous flux collector is part of the lighting device, it is optically aligned with the light source so that it directs luminous flux emitted therefrom to a focal point that has a diameter less than 200 microns on the terminal end of the optical fiber when it is held in the fixed position within the coupling.

A method is also provided that includes the features of collecting luminous flux from a light source, such as a light emitting diode, and directing it to a focal point with a diameter less than 200 microns in diameter. For example, the focal point, in one aspect of the disclosure is directed onto a terminal end of an optical fiber. In the preferred method the optical fiber is a light-diffusing fiber. Disclosed methods include capturing luminous flux from a spread angle of at least 120 degrees with a wide-angle light capturing device, transferring luminous flux from the wide-angle light capturing device into an optical collimating device, and funneling the luminous flux into a 200-micron diameter focal point on the terminal end of the optical fiber.

In preferred embodiments, using an LED light source, and the disclosed luminous flux collector, a practical amount of luminous flux is obtained for illuminating a light-diffusing fiber that has a diameter less than 200 microns. Such a practical amount in one aspect is at least 5% of the luminous flux, with this portion being fully collimated. Disclosed herein are devices and methods for illuminating light-diffusing fibers that are used for lighting that is both decorative and functional, and other optical fibers. For light-diffusing fibers it is not necessary to capture all of the light from the light source, but enough light is needed for the light-diffusing fiber to give off enough light to serve its intended purpose, for example at least 5% of the luminous flux of an LED.

Previously known luminous flux collectors designed for laser light sources were not capable of collecting sufficient amounts of light from LED light sources to allow economically advantageous LED light sources to replace laser light sources for applications like the illumination of small diameter light-diffusing optical fibers with a diameter less than 200 microns. The disclosed luminous flux collector, lighting device and method of using same provide solutions that enable laser light sources to be replaced with LED light sources.

DETAILED DESCRIPTION OF ILLUSTRATIVE EMBODIMENTS

Figure 1:
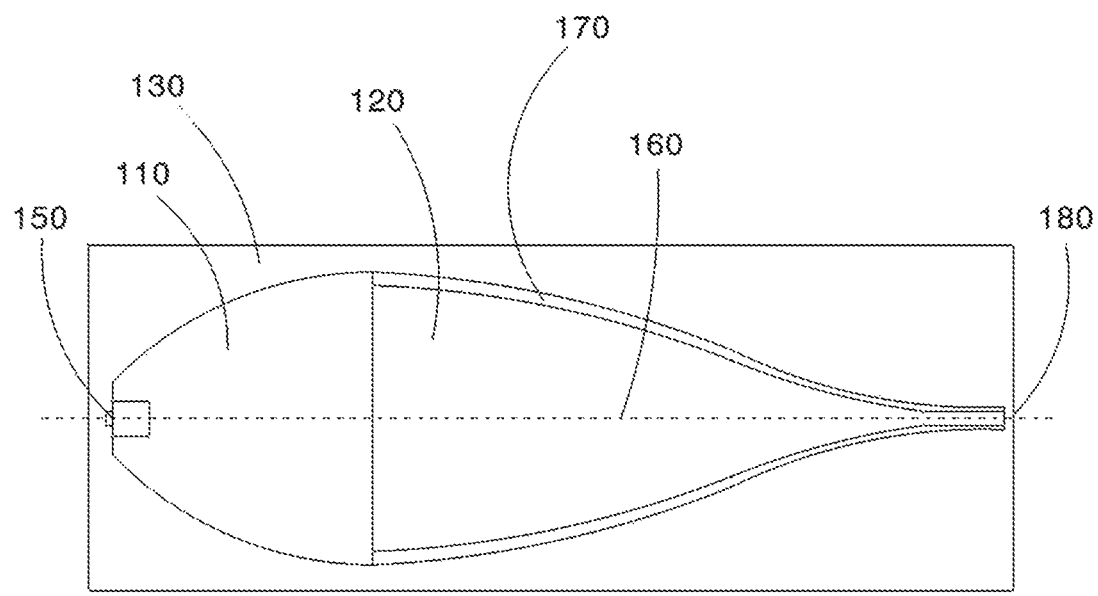
FIG. 1 shows a section view of a luminous flux collector in accordance with disclosed embodiments.

Reference is now made in detail to the present preferred embodiments, examples of which are illustrated in the accompanying drawings. When possible, the same reference numerals are used throughout the drawings to refer to the same parts, and if the parts are the same and indicated by the same reference numeral, for brevity such parts may not be re-introduced and described with respect to each drawing. If the parts are not the same, but similar in function, like reference numerals are used. In addition, and where applicable, features of one described example embodiment may be substituted for other features providing similar functions of other example embodiments.

The following detailed description represents embodiments that are intended to provide an overview or framework for understanding the nature and character of the claims. The accompanying drawings are included to provide further understanding of the claims and constitute part of the specification. Accordingly, the detailed descriptions and drawings are non-limiting to the scope of what is claimed, and are intended to illustrate and explain the principles and operations of these embodiments, as claimed.

As described above, the properties of light generated from a LED light source are different from the light generated from a laser, and this calls for a different approach for collecting and collimating at least 5% of the luminous flux into a small diameter light-diffusing fiber. While light beams generated by lasers are already narrow, with low-divergence (if not non-divergent), light beams generated by LEDs have a large angular spread, typically around 160 degrees. As described below in disclosed examples, multiple optical elements, e.g. lenses or reflectors, are described to direct a significant amount of light into the terminal end of a light-diffusing fiber that has a diameter less than 200 microns. Optical fibers, for example, Fibrance® branded light-diffusing fibers, can be housed in different casings depending upon the application and this can result in different outside diameters, but the core light-diffusing fiber typically has a smaller diameter. For example Fibrance® branded light-diffusing fibers have a core diameter of about 170 microns. While we discuss Fibrance® branded light-diffusing fibers throughout this application, the example disclosed luminous flux collectors can be used with other light-diffusing fibers or other optical fibers with a diameter that is less than 200 microns, regardless of manufacturer or type.

Disclosed light-diffusing fibers can be a single fiber or a plurality of fibers bundled together. To enable the use of an LED light source for such small diameter (less than 200 microns) light-diffusing fibers, a plurality of optical components (light collecting and focusing devices) with different properties are combined as described in the below examples. The disclosed example wide-angle light capture devices and luminous flux collectors can be adapted to lights sources of various emission angles provided suitable adjustments are made to the collectors for the given angle of emission and the corresponding size of the optical fiber core.

Referring to FIGS. 1 through 7, each of the illustrated embodiments include a housing for a luminous flux collector, which includes, or is adapted to hold or mount to, an LED light source at one end of a longitudinal axis and an opposite end that is adapted to being connected by a coupling to a terminal end of a light-diffusing fiber. Each of the embodiments is shown in section view, with the section cut through longitudinal axis 160 of each luminous flux collector, cutting the luminous flux collector in half.

In preferred embodiments the luminous flux collector is symmetrical around longitudinal axis 160, meaning that section views perpendicular to the illustrated view and looking down longitudinal axis 160, would show the optical lenses and reflectors to be circular.

Centered along the longitudinal axis, in various configurations, is a wide-angle light capture device which surrounds the light emitting portion of the LED light source and is shaped to capture light from at least a 120-degree spread and up to about 180 degrees. That is, unlike luminous flux collectors for laser light sources, in order to use an LED light source, the first step in collecting luminous flux is to collect light from a wide-angle spread, for example greater than about 120-degrees.

Next, after a large amount (up to about 95%) of the luminous flux emitted from the light source has been captured by the wide-angle light capture device, a light-focusing device is employed to funnel and collimate the luminous flux into a spot with a diameter less than 200 microns at the end associated with a coupling to a terminal end of the light-diffusing fiber. That is, at least one other device for collimating the luminous flux captured by the wide-angle light capture device is aligned with the longitudinal axis and interposed between the wide-angle light capture device and the coupling end of the luminous flux collector.

With reference to FIG. 1, a first embodiment of a luminous flux collector is shown that combines solid core near field lens 110 and a tapered solid core 120 held within housing 130. Each of near field lens 110 and tapered solid core may be formed of, for example, typical materials used for making optical components, including glass and plastic materials such as polycarbonate. Different parts of the lens can be joined together using a UV curable clear glue, ultrasonic welding, etc.

Housing 130 may be formed of any material suitably rigid to maintain the disclosed components in optical alignment for example plastic, rubber, other any other natural or synthetic material. Housing 130 is adapted to receive LED light source 150 via friction fit or adhesive and to attach to a coupling (not shown) at the opposite end along longitudinal axis 160.

Near field lens 110 serves as a wide-angle light capture device, being shaped to capture luminous flux from the wide angle spread of the LED light by having a cross-sectional area much wider than the LED light source and having a curved shape to reflect the path of the luminous flux closer to being parallel with longitudinal axis 160. Accordingly, while near field lens 110 has as its primary function the capture of the luminous flux and reflect it along longitudinal axis 160, it can also do some collimation. Tapered solid core 120 is adapted to funnel the luminous flux towards focal point 180 at the coupling end, where the collimated luminous flux is concentrated onto an area with a diameter less than 200 microns. Cladding 170 surrounds tapered solid core 120 and can be any material having a higher refractive index to promote total internal reflection ("TIR") at the interface between the solid core and the cladding, or the tapered solid core 120 can have a reflective interior facing surface to help with light reflection.

Compared to luminous flux generated by lasers, which has very different properties that are more conducive to transmitting most of the light into a light-diffusing fiber, successful implementation with an LED light source is achieved when sufficient luminous flux is directed into a light-diffusing fiber to generate the desired lighting effect. Such luminous flux can successfully be achieved with this, and the other disclosed embodiments, even though there can be some losses of the luminous flux, on account of the properties of light generated from an LED light source. That is, even with some losses in luminous flux, these embodiments represent an advance in the state of the art because such levels of luminous flux delivered to the fiber could not otherwise be achieved with an LED and the luminous flux collectors designed for laser light sources.

Figure 2:
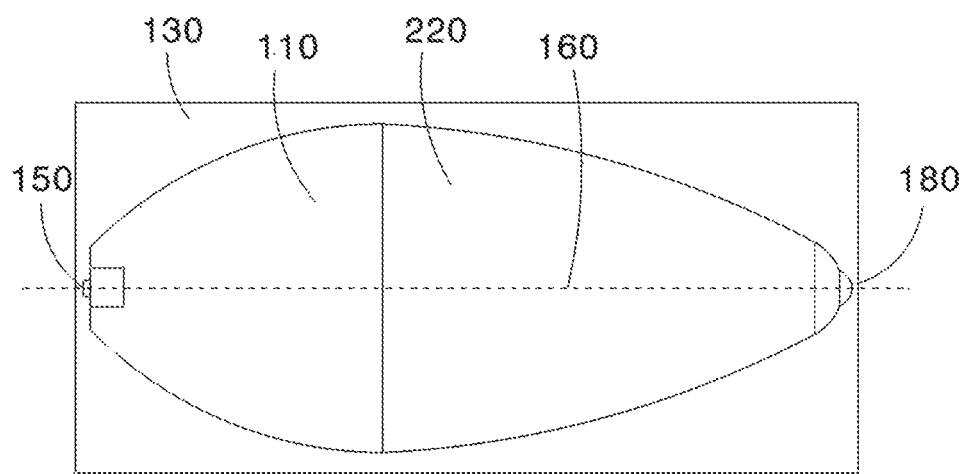
FIG. 2 shows a section view of a luminous flux collector in accordance with disclosed embodiments.

FIG. 2 is an embodiment of a luminous flux collector where near field lens 110 is combined with backward near field lens 220. As in the embodiment shown in FIG. 1, near field lens 110 serves to capture the luminous flux emitted from LED light source 150 while also assisting with collimation but again a secondary light focusing device is employed to focus the luminous flux onto the terminal end of the light-diffusing fiber. Backward oriented near field lens 220 acts as a luminous flux concentrator. Each reflection of light from the reflective surfaces of near field lens 110 and backward near field lens 220 incrementally bends the luminous flux towards a focal point, which for this luminous flux collector is a spot less than 200 microns in diameter that coincides with the terminal end of a light-diffusing fiber.

Compared to the embodiment of FIG. 1, the embodiment of FIG. 2 allows more loss of luminous flux due to an increased probability of light absorption as a result of multiple reflection events, but it can be made smaller because backward near field lens 220 can be more compact than the tapered solid core 120. In applications where space is limited, the embodiment of FIG. 2 can be chosen.

Figure 3:
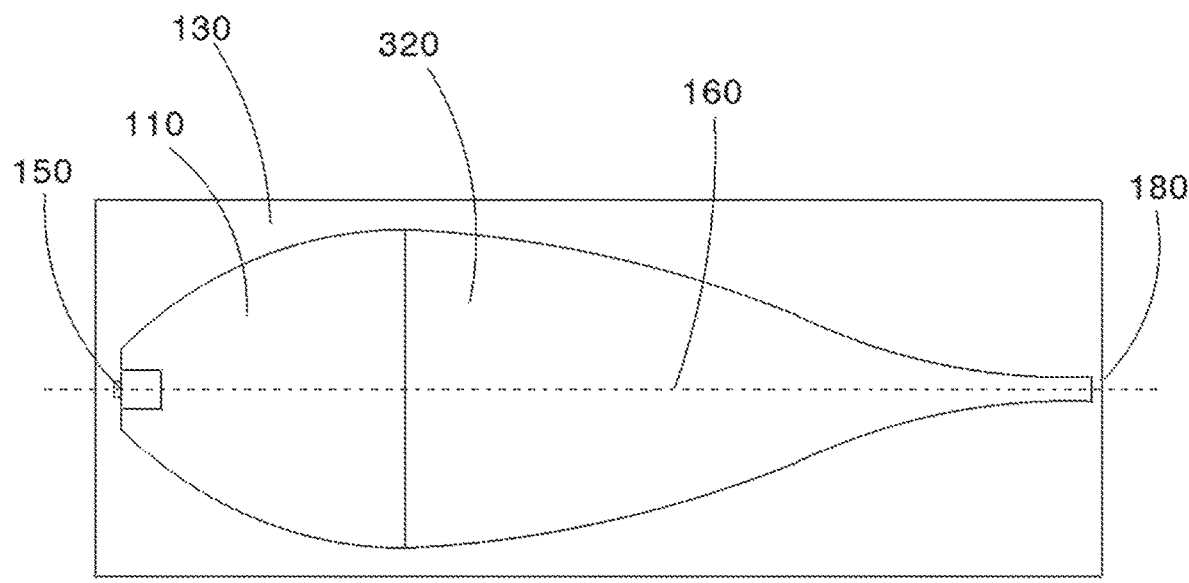
FIG. 3 shows a section view of a luminous flux collector in accordance with disclosed embodiments.

FIG. 3 is yet another embodiment of a luminous flux collector that comprises forward near field lens 110 combined in optical alignment with specular funnel 320, which has a mirrored or otherwise reflective surface so that luminous flux is reflected towards focal point 180. The functions and materials are similar to the embodiments of FIGS. 1 and 2.

Figure 4:
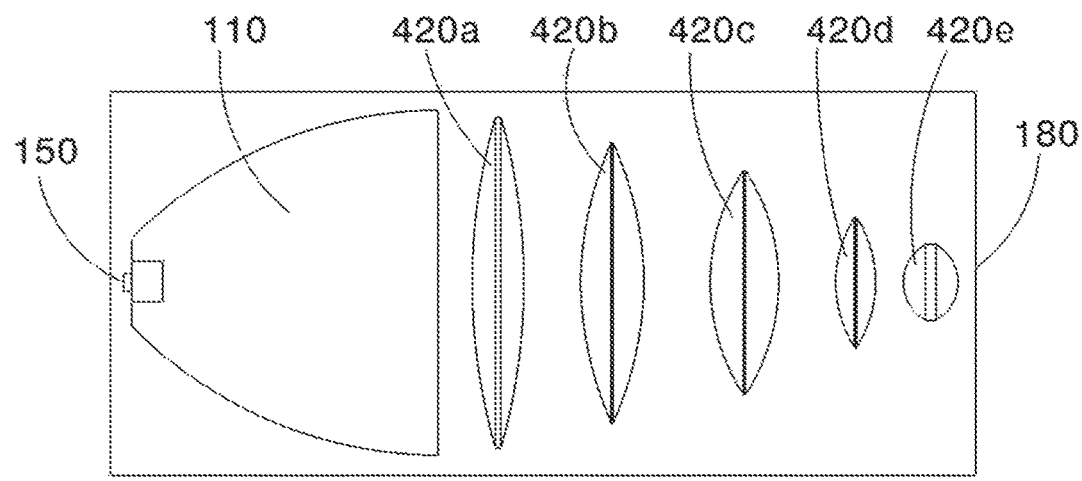
FIG. 4 shows a section view of a luminous flux collector in accordance with disclosed embodiments.

FIG. 4 is an embodiment of a luminous flux collector that combines forward near field lens 110 with a plurality of focusing lenses 420a, 420b, 420c, 420d and 420e, each lens having a different bending power and bending the luminous flux closer towards focal point 180 which is where the terminal end of the light-diffusing fiber is positioned, when coupled to the luminous flux collector. Each of lenses 420a, 420b, 420c, 420d and 420e are configured to have an increasing bending power going from the source to the target. In one example the lenses 420a, 420b, 420c, 420d and 420e are at least one of plano-convex and biconvex lenses. While five focusing lenses are shown, this is an example of an arrangement having a plurality of focusing lenses. This terminal end comprises an aperture surface through which the luminous flux is received into the fiber. The functions and materials of the components described with reference to FIG. 4 are similar to the previously described embodiments.

Figure 5:
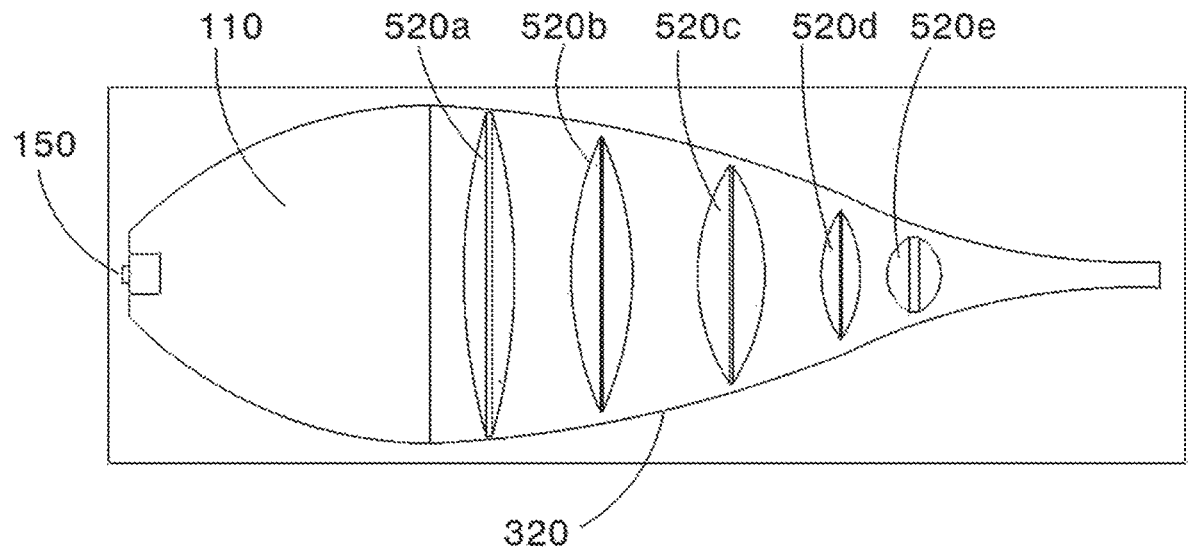
FIG. 5 shows a section view of a luminous flux collector in accordance with disclosed embodiments.

FIG. 5 is an embodiment of a luminous flux collector that is similar to that of FIG. 4 combined with the embodiment of FIG. 3. That is, after the luminous flux is captured by near field lens 110, the second optical collimating device combines a series of lenses 520a, 520b, 520c, 520d, 520e each with different and increasing light bending power from the light source to the targer, with specular funnel 320, which can be made reflective or designed based upon TIR. The lenses 520a, 520b, 520c, 520d, 520e are similar in design and application as those of 420a, 420b, 420c, 420d and 420e however, the lenses 520a, 520b, 520c, 520d, 520e may ultimately have different bending power compared to those discussed with FIG. 4 due to additional collimating effects of specular funnel 320, which will ultimately improve light collimation. In one example configuration, the lenses 520a, 520b, 520c, 520d, 520e are smaller in size and number and the bending power may not have to increase steeply going from source to target as compared to the lenses 420a, 420b, 420c, 420d and 420e of FIG. 4. The functions and materials of the components described with reference to FIG. 5 are similar to the previously described embodiments.

Figure 6:
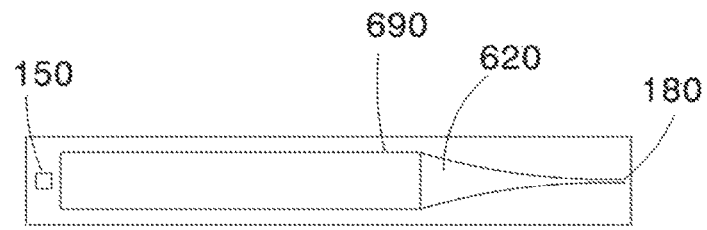
FIG. 6 shows a section view of a luminous flux collector in accordance with disclosed embodiments.

FIG. 6 is another embodiment of a luminous flux collector that shows that the wide-angle light capturing device that is the first stage in collecting the luminous flux need not be a near-field lens. In this embodiment the luminous flux collector is a light guide that comprises cylindrical light pipe 690 combined with tapered light pipe 620. A high refractive index cladding or a reflective surface can be used to reduce flux loss at bend 620.

Compared to some of the other embodiments, the embodiment of FIG. 6 would be easier to make and cost less to manufacture due to the lesser complexity of the collimating system and a smaller number of parts required. However, the optical performance is not as good as the other illustrated embodiments because there is not as much collimation of the luminous flux and the light only is TIR-ed from one end to the other side where the fiber optic is coupled to the tapered end of the light pipe. The functions and materials of the components described with reference to FIG. 6 are similar to the previously described embodiments.

Figure 7:
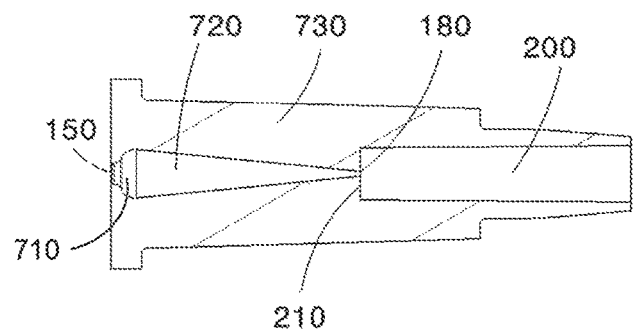
FIG. 7 shows a section view of a luminous flux collector in accordance with disclosed embodiments.

FIG. 7 shows one more embodiment of a luminous flux collector that shows housing 730, light diffusing fiber 200 and aperture surface 210. The luminous flux collector shown in this embodiment is a reflective hollow funnel with a light reflective surface made of, for example, aluminum coating or cladding on plastic or solid piece. This reflective funnel has two distinct sections, with first section 710 being a wide-angle light capturing bowl having a, for example, parabolic or freeform shape. The first section 710 may in some examples have an inflection point changing the shape from convex to concave or the reverse. In another example, there is no inflection point and the shape is concave towards the center axis. The first section 710 is joined to tapering funnel 720 at the widest portion of first section 710. Taper funnel 720 has a decreasing radius away from light source 150 and tapers to a radius of about 200 microns or less. Taper funnel 720 also includes a light reflective surface, for example aluminum coat/clad on plastic, for focusing the luminous flux onto focal point 180 on aperture surface 210.

Compared to other illustrated embodiments, the embodiment of FIG. 7 is one of the least expensive to make and one of the easiest to manufacture, but compared to the other illustrated embodiments, it has the lowest optical performance due to higher absorption loss, so this embodiment would be useful for applications where reducing the cost to manufacture is more important than the brightness of the light-diffusing fiber. The functions and materials of the components described with reference to FIG. 7 are similar to the previously described embodiments.

While the illustrated embodiments show particular examples, various modifications and alterations may be made to the examples within the scope of the claims and aspects of the different examples may be combined in different ways to achieve further embodiments. Accordingly, the scope of the claims is to be understood from the entirety of the present disclosure in view of, but not limited to the embodiments illustrated and described herein. That is, with the benefit of the teachings of this disclosure it will be apparent that various modifications and variations can be made without departing from the spirit or scope of the claims.

What is claimed is:

1. A luminous flux collector comprising:
    a housing having a longitudinal axis;
    a wide-angle light capturing device with a receptacle for receiving a light source, said wide-angle light capturing device adapted to collect luminous flux emitted from the light source with a spread angle of at least 120 degrees and up to about 180 degrees from said light source, and said wide-angle light capturing device being disposed within a proximal end of said housing along said longitudinal axis; and
    an optical collimating device aligned with said longitudinal axis and extending from said wide-angle light capturing device to a distal end of said housing along said longitudinal axis,
    wherein the wide-angle light capturing device and the optical collimating device are together shaped to diffract and internally reflect the luminous flux from said light source thereby bending and directing the luminous flux from said light source to a focal point less than 200 microns in diameter at said distal end.

2. The luminous flux collector of claim 1, wherein said wide-angle light capturing device is a near field lens.

3. The luminous flux collector of claim 2 wherein said near field lens is a solid light transmitting lens with a concave surface facing said light source.

4. The luminous flux collector of claim 2, wherein said near field lens is formed by a parabolically-shaped light-reflective interior surface.

5. The luminous flux collector of claim 4, wherein said light-reflective interior surface is shaped to utilize total internal reflection by capturing luminous flux striking said light-reflective interior surface at an angle greater than a critical angle.

6. The luminous flux collector of claim 1, wherein said wide-angle light capturing device has a cylindrical shape with a light-reflective interior surface.

7. The luminous flux collector of claim 1, wherein said optical collimating device is a tapered optical pipe.

8. The luminous flux collector of claim 7, wherein said tapered optical pipe has a surface adjoining said wide-angle light capturing device that is concave and that changes to a convex curvature nearer to said distal end.

9. The luminous flux collector of claim 1, wherein said optical collimating device is a backward near field lens.

10. The luminous flux collector of claim 1, wherein said optical collimating device is a specular funnel.

11. The luminous flux collector of claim 1, wherein said optical collimating device comprises multiple focusing lenses.

12. The luminous flux collector of claim 11, wherein said housing has an interior surface surrounding said optical collimator that is optically reflective.

13. The luminous flux collector of claim 12, wherein said interior surface is shaped to utilize total internal reflection by light striking said interior surface at an angle greater than a critical angle.

14. The luminous flux collector of claim 1, wherein said wide-angle light capturing device and said optical collimating device, together form a teardrop shape with the wide-angle light capturing device being associated with a wide side of said teardrop shape and said optical collimating device spanning from said wide side of said teardrop shape to a point of said teardrop shape.

15. The luminous flux collector of claim 1, wherein said wide-angle light capturing device and said optical collimating device are formed as one unified piece.

16. The luminous flux collector of claim 1, wherein the light source is at least one light emitting diode centered on said longitudinal axis at the proximal end of the housing and is adapted to emitting the luminous flux.

17. The luminous flux collector of claim 1, further comprising a coupling associated with a distal end of the housing opposite the proximal end, the coupling having a mechanism for holding a terminal end of an optical fiber in a fixed position within the coupling at the focal point to receive the collimated luminous flux.

* * * * *